Aug. 4, 1931.   W. P. HOBART   1,817,145
RESPIRATION METER
Filed Oct. 18, 1928
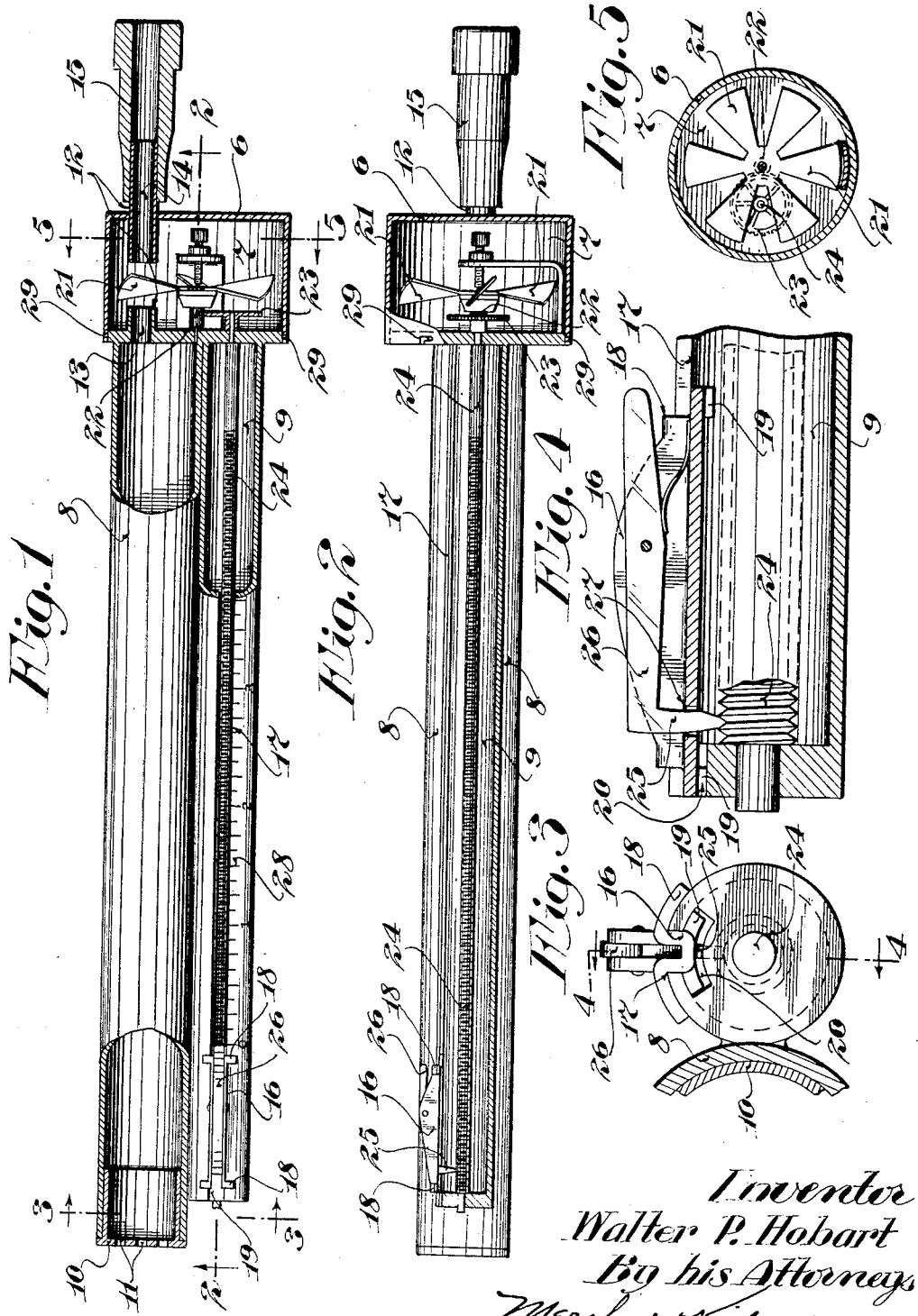
Inventor
Walter P. Hobart
By his Attorneys
Merchant & Kilgore Patented Aug. 4, 1931

1,817,145

UNITED STATES PATENT OFFICE

WALTER P. HOBART, OF MINNEAPOLIS, MINNESOTA

RESPIRATION METER

Application filed October 18, 1928. Serial No. 313,271.

My invention has for its object the provision of a simple and highly efficient respiration meter and to this end, it consists of the novel devices and combinations of 5 devices hereinafter described and defined in the claims.

The respiration meter illustrated is designed to indicate lung capacity in cubic inches and may be used by physicians for 10 measuring both inhalation and exhalation as well as lung capacity. Said invention is especially well adapted for individual use in taking systematic lung exercise, measuring lung capacity and in making respira15 tion tests from time to time. This instrument is also well adapted for applying medication by inhalation.

In the accompanying drawings, which illustrate the invention, like characters indi20 cate like parts throughout the several views.

Referring to the drawings:

Fig. 1 is a view of the improved respiration meter with some parts broken away and other parts shown in longitudinal central 25 section;

Fig. 2 is a view partly in side elevation and partly in longitudinal section taken on the irregular line 2—2 of Fig. 1;

Fig. 3 is a view partly in end elevation 30 and partly in transverse section taken on the line 3—3 of Fig. 1, on an enlarged scale;

Fig. 4 is a fragmentary detail view partly in elevation and partly in longitudinal section taken on the line 4—4 of Fig. 3; and 35 Fig. 5 is a transverse section taken on the line 5—5 of Fig. 1.

The numeral 6 indicates a cylindrical casing both ends of which are closed and affording a propeller chamber 7. Main and 40 secondary tubular members 8 and 9, respectively, are rigidly connected and rigidly secured at their inner ends to the inner end of the casing 6. These tubular members 8 and 9 extend parallel to each other and to 45 the axis of the casing 6. A thimble 10 closes the outer end of the tubular member 8 and has formed therein a plurality of air ports 11.

Extending through the propeller chamber 50 7 parallel to its axis is a two-part tube 12 the sections of which are axially spaced within said chamber, see Fig. 1, for a purpose that will presently appear. The sections of the tube 12 afford inner and outer air ports 13 and 14, respectively, the former of which connects the interior of the tubular member 8 with the propeller chamber 7. A removable mouth piece 15 is applied to the outer section of the tube 12 which projects outward of the casing 6.

An indicator 16 in the form of a slide is mounted on the tubular member 9 for traveling movement in a way 17 formed in said member. This way 17 is in the form of a slot which extends longitudinally of the tubular member 9 and the full length thereof. By reference to Fig. 3, it will be noted that the body of the indicator 16 snugly fits in the way 17 for free sliding movement longitudinally thereof. This indicator 16 has at its ends upper and lower pairs of lugs 18 and 19, respectively, between which the longitudinal edge portions of the tubular member 9 at the way 17 extend and hold said indicator for straight line sliding movement and against either inner or outer radial movements in respect to said tubular member.

A passageway 20 is formed in the outer end of the tubular member 9 through which the indicator 16 is inserted when applying or removing the same from said tubular member 8.

The indicator 16 is operated to cause the same to travel in either direction in the way 17 by a propeller 21 journaled in the chamber 7 with its blades arranged to rotate transversely between the spaced inner end of the tube 12. This propeller 21 has on its shaft a pinion 22 which meshes with a gear 23 on the inner end of a long feed screw 24 one end of which is journaled in the casing 6 and the other end of which is journaled in the outer end of the tubular member 9. The indicator 16 is releasably connected to the feed screw 24 to be operated thereby by a nut-acting member in the form of a relatively sharp tooth-like dog 25 which extends into said screw, see Fig. 4. This dog 25 is formed on one end of a spring pressed lever 26 and projects laterally therefrom. The lever 26 is intermediately fulcrumed to and between a pair of laterally spaced flanges on the indicator 16 with the dog 25 working through a pasageway 27 in said indicator.

A scale 28 with which the indicator cooperates to measure lung capacity in cubic inches is indicated on the tubular member 9 at one side of the way 17. Obviously, by depressing the outer end of the lever 26 the dog 25 may be released from the feed screw 24 to permit the indicator 16 to be adjusted longitudinally in respect thereto and positioned in any desired adjustment thereon or to permit said indicator to be returned to the zero point on the scale 28.

By reference to Figs. 1 and 2, it will be noted that the casing 6 is detachably secured to its inner end by bayonet joints 29. Obviously, by removing the casing 6 from its inner end, access may be had to the propeller 21 or other parts within said casing.

By exhalation through the mouth piece 15, the propeller 21 may be operated to rotate the screw 24 and thereby cause the indicator 16 to travel inward from the zero point of the scale 28 and a reading may be taken on said scale when the indicator 16 stops. By inhalation, the propeller 21 will be operated to impart a reverse movement to the feed screw 24 and hence the indicator 16.

As heretofore stated, the instrument may be used in applying medication by inhalation and in which case the inhalant will be placed in the tubular member 8 where the air will pass over the same during its travel from the ports 11 to the port 13 and from thence through the port 14 and mouth piece 15.

What I claim is:

A device of the class described, comprising main and secondary tubular members, the former of which has at one end a casing, and at its other end an exhaust port, said casing having a mouth piece and a port leading to said member, a propeller in said casing arranged to be operated either by inhalation or exhalation through the mouth piece, a travelling indicator mounted in said secondary member, and speed reduction connections for operating the indicator from the propeller.

In testimony whereof I affix my signature.

WALTER P. HOBART.